United States Patent [19]

Azuma et al.

[11] Patent Number: 5,377,487
[45] Date of Patent: Jan. 3, 1995

[54] AXLE DRIVING APPARATUS HAVING OFFSET OUTPUT SHAFT

[75] Inventors: Toshiro Azuma; Hideaki Okada, both of Amagasaki, Japan

[73] Assignee: Kanzaki Kokyukoki Mfg. Co., Ltd., Hyogo, Japan

[21] Appl. No.: 87,076

[22] Filed: Jul. 7, 1993

[30] Foreign Application Priority Data

Jul. 7, 1992 [JP] Japan .................. 4-047347

[51] Int. Cl.6 .............................................. F16D 39/00
[52] U.S. Cl. ............................................ 60/487; 91/499
[58] Field of Search ................. 60/487, 488, 489, 490; 91/505, 499

[56] References Cited

U.S. PATENT DOCUMENTS

| | | | |
|---|---|---|---|
| 4,870,820 | 10/1989 | Nemoto | 60/487 |
| 4,903,545 | 2/1990 | Louis et al. . | |
| 4,905,472 | 3/1990 | Okada | 60/487 |
| 4,914,907 | 4/1990 | Okada . | |
| 4,932,209 | 6/1990 | Okada et al. . | |
| 4,953,426 | 9/1990 | Johnson . | |
| 4,986,073 | 1/1991 | Okada . | |
| 5,010,733 | 4/1991 | Johnson . | |
| 5,042,252 | 8/1991 | Havens et al. | 60/487 |
| 5,067,933 | 11/1991 | Hardesty et al. | 60/487 X |
| 5,078,659 | 1/1992 | von Kaler et al. . | |
| 5,090,949 | 2/1992 | Thoma et al. . | |
| 5,203,169 | 4/1993 | Ishii et al. | 60/487 |

FOREIGN PATENT DOCUMENTS 3-153951 7/1991 Japan .
4-92726 3/1992 Japan .

*Primary Examiner*—Edward K. Look
*Assistant Examiner*—Hoang Nguyen
*Attorney, Agent, or Firm*—Sterne, Kessler, Goldstein & Fox

[57] ABSTRACT

An axle driving apparatus which houses a hydraulic non-stage transmission in a casing comprised of at least two casing members and coupled by a substantially flat coupling surface formed therebetween. The casing also houses an output shaft of the hydraulic non-stage transmission which is offset in parallel to the coupling surface. This construction allows for simple manufacture and maintenance of the hydraulic non-stage transmission and axles, provides for a smaller downward projection of the casing thereby reducing interference with obstacles on the ground, improves sealing capability of the casing when a braking unit is attached to one axial end of the output shaft, and reliably bears the thrust of the hydraulic motor.

22 Claims, 10 Drawing Sheets

AXLE DRIVING APPARATUS HAVING OFFSET OUTPUT SHAFT

FIELD OF THE INVENTION

The present invention relates to an axle driving apparatus which houses a hydraulic non-stage transmission, otherwise known as a hydrostatic transmission.

BACKGROUND OF THE INVENTION

An axle driving apparatus which houses a hydraulic non-stage transmission and axles in a common casing is well known in the art as disclosed in the Japanese Patent Laid-Open Gazette No. Hei 4-92726; U.S. Pat. Nos. 5,090,949; 5,078,659; 4,986,073; 4,914,907; 4,932,209; 4,903,545; 5,010,733; 4,953,426; and Japanese Patent Laid-Open Gazette No. Hei 3-153951.

To simplify construction of the hydraulic non-stage transmission and the axles in the casing, the above-referenced patent documents describe the use of two separate casing members which are coupled along a flat surface to form a single casing. The axis of an output shaft of the hydraulic non-stage transmission and of the axles is contained in tile plane of the coupling surface.

This arrangement has the following disadvantages:

First, when the casing parts are separated for maintenance, all of the interior parts must be disassembled and separated from the casing, and later reassembled following the maintenance.

Second, where the axle driving apparatus is equipped with a braking device, it is usually attached at an output shaft of a hydraulic motor in order to minimize the size of the braking device. The output shaft projects outwardly from the casing, and a brake disc is fixed to the projection. Left and right axles project outwardly from the casing for mounting wheels.

Operating oil used for the hydraulic non-stage transmission or lubricating oil used for the various power transmitting gears is housed in the casing. An oil seal placed on the portion of the output shaft or axle projecting from the casing prevents the oil frown leaking therefrom.

However, because the oil seal spans the two casing members, when there is a tolerance error in manufacturing either the casing or the seal, oil leaks through the coupling surface. As a result, additional means for sealing, such as liquid packing applied to the entire outer periphery of the oil seal, is used to prevent the oil from leaking. This procedure increases the time required to assemble the seal, thus decreasing productivity. Also, this type of seal is expensive to produce.

The third disadvantage is that in hydraulic non-stage transmissions which have an axial piston hydraulic motor, the slanted portion does not reliably bear the thrust of the pistons. This slanted portion, which is subject to the thrust of the pistons, crosses the coupling surface of the casing members. U.S. Pat. No. 4,953,426 discloses additional support for the slanted portion by using integral fingers in the casing which extend from one casing member to the other member across the coupling surface. However, these integral fingers may not be strong enough to bear the thrust of the pistons.

SUMMARY OF THE INVENTION

The present invention provides an axle driving apparatus with a casing which allows for simple construction of the hydraulic non-stage transmission and axles, improves maintenance capability thereafter, raises sealing capability when a braking device is attached to the apparatus, and reliably bears the thrust of the piston of a hydraulic motor. The above invention will be further explained in the following detailed description when read in connection with the accompanying drawings.

Description of the Preferred Embodiment

Figure 1:
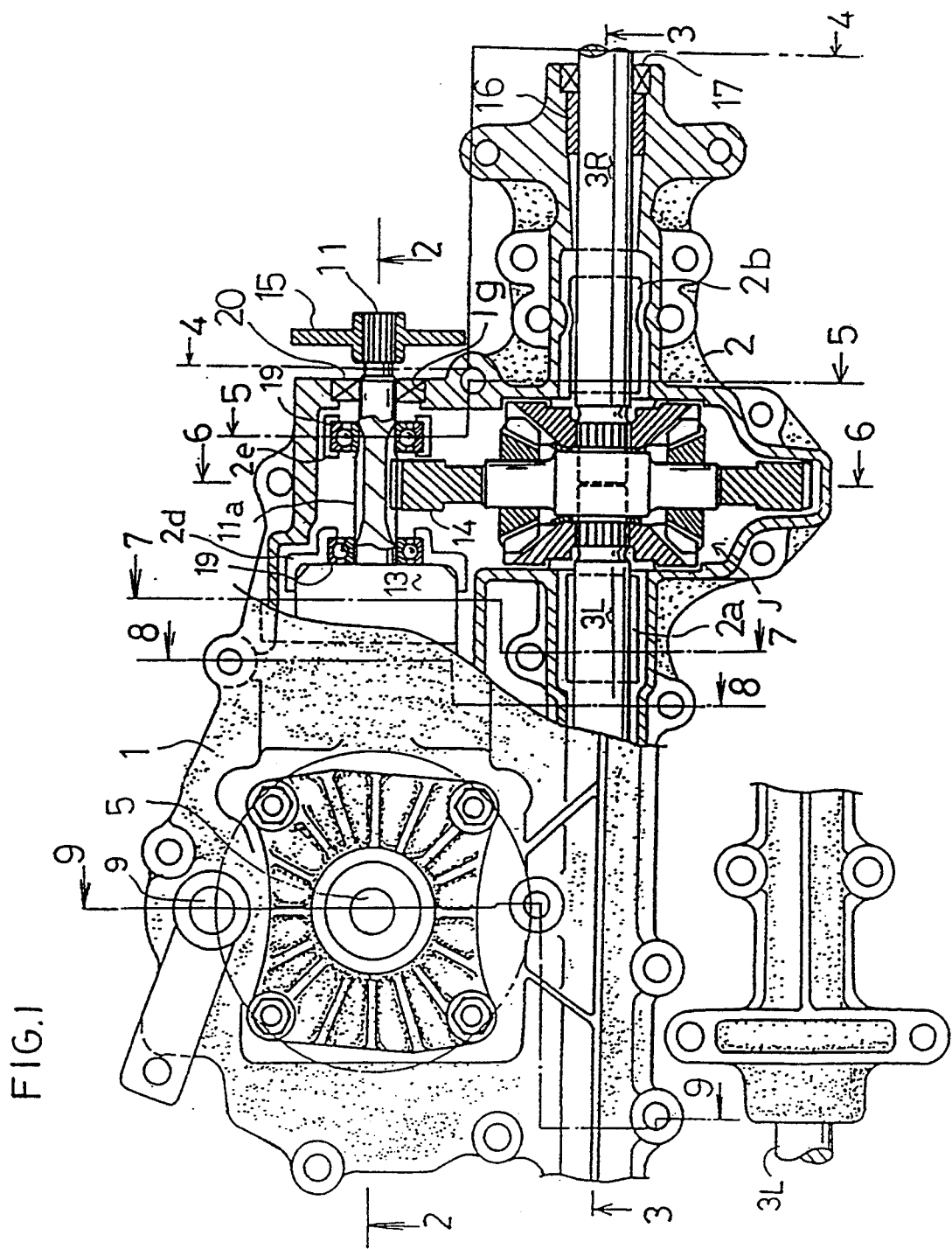
FIG. 1 is a partial cross-sectional plan view of the axle driving apparatus of the present invention, which houses a hydraulic non-stage transmission in a casing.

As shown in FIG. 1, an axle driving apparatus is comprised of a casing member 1 and a casing member 2 coupled along substantially flat surfaces to form a unitary casing. A hydraulic non-stage transmission, a differential gear J, and axles 3L and 3R, are housed in and supported by the casing.

Figure 2:
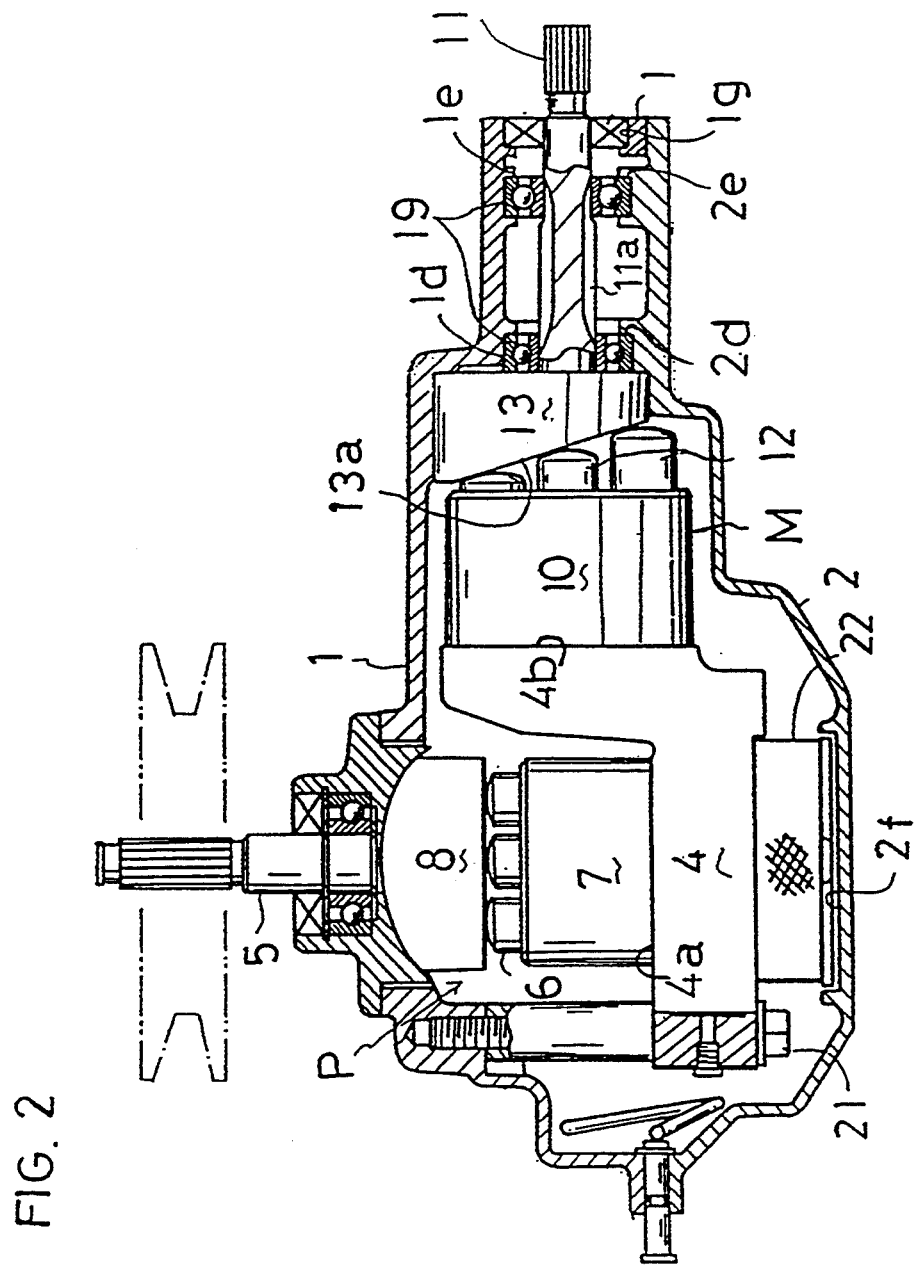
FIG. 2 is a cross-sectional view taken along line 2—2 of FIG. 1.

The hydraulic non-stage transmission, as shown in FIG. 2, comprises a hydraulic pump P, a hydraulic motor M, and a center section 4 for hydraulically coupling the pump P and motor M. Center section 4 is substantially L-shaped in cross section with a pump mounting surface 4a and a motor mounting surface 4b extending perpendicularly to each other. Center section 4 is fixed to casing member 1 by three bolts 21 such that hydraulic pump mounting surface 4a is included in substantially the same plane as the coupling surface of casing members 1 and 2; hydraulic motor mounting surface 4b is substantially perpendicular to the coupling surface. Hydraulic pump P is of the axial plunger piston type having an input shalt 5 connected to a drive source (shown in phantom), such as an engine, through a belt transmitting mechanism (not shown). A cylinder block 7 is coupled with input shaft 5 and rotatably mounted on pump mounting surface 4a. A plurality of reciprocal pistons freely project therefrom. A movable swash plate 8 is in contact with a head of each piston 6 and is adapted to change its slant angle by rotation of a speed change shaft 9 (see FIG. 9) pivotally supported to casing member 1.

Hydraulic motor M, as shown in FIG. 2, is also of the axial plunger piston type having a fixed member 13 sandwiched between casing members 1 and 2. A plurality of reciprocal pistons 12 are projectable and retractable along a slanted portion 13a of fixed member 13. A major portion of fixed member 13 is secured to casing member 1, thereby enabling the thrust from pistons 12 to be reliably received by a single casing part. A cylinder block 10, containing therein pistons 12, is rotatably mounted to motor mounting surface 4b. An output shaft 11 is coupled with cylinder block 10. Within center section 4 is an oil-feedside passage (not shown) and an oil-return-side passage (not shown) forming a closed circuit for pressure oil. When input shaft 5 is driven by an engine or the like through a belt, the rotation of input shaft 5 sends the pressure oil from hydraulic pump P to hydraulic motor M through the oil-feedside passage, thereby driving output shaft 11.

Figure 4:
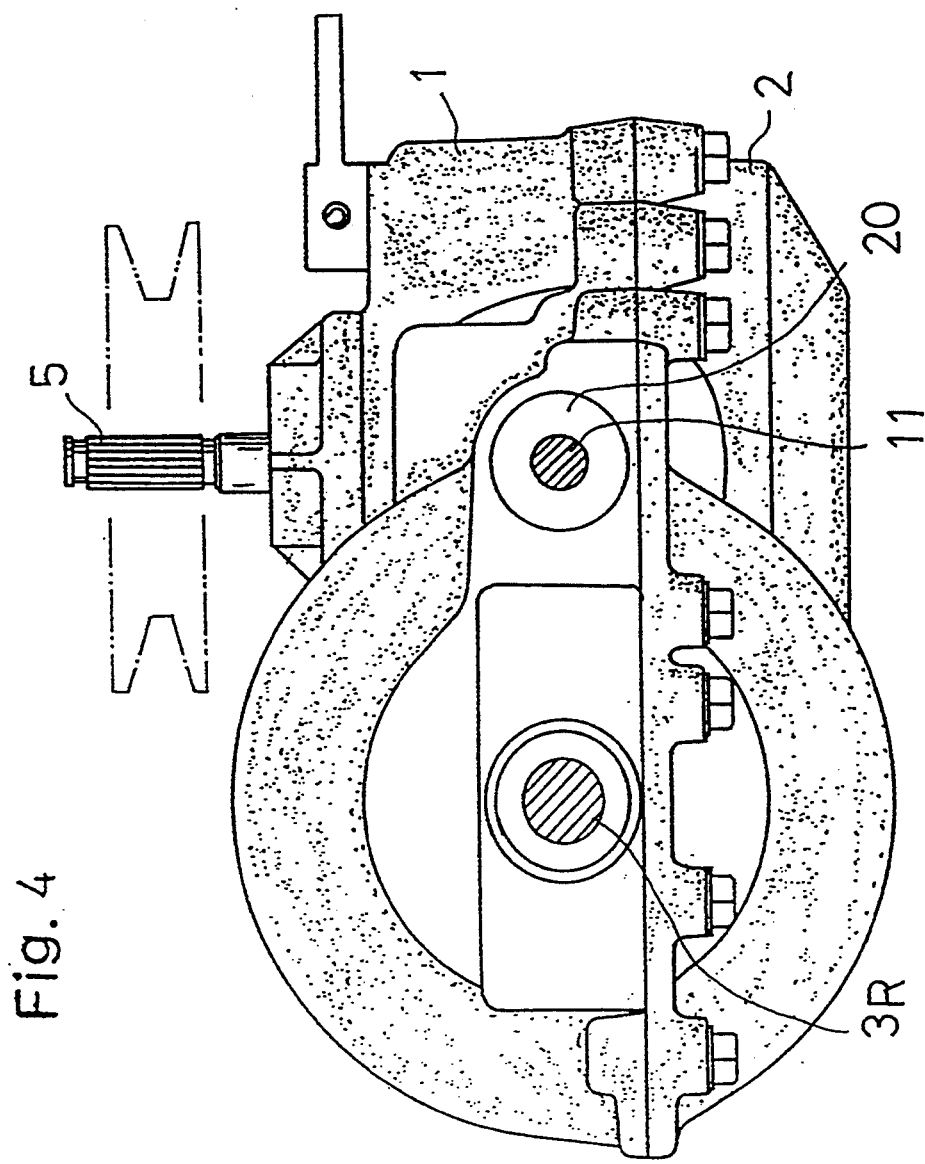
FIG. 4 is a partial cross-sectional view taken along line 4—4 of FIG. 1.

As shown in FIG. 1, output shaft 11 is offset in parallel with respect to the coupling surface of casing 1 and 2 such that the longitudinal axis of output shaft 11 is not disposed within the same plane as the coupling surface. Cylinder block 10 of hydraulic motor M is mounted onto motor mounting surface 4b so that output shaft 11 is positioned at a side of casing member 1. Output shaft 11 projects from casing member 1 through an opening 1g provided in casing member 1. An oil seal 20 (see FIG. 4) for closing opening 1g bored in the side wall of casing member 1 to accommodate output shaft 11 is also provided. A brake disc 15 is fixed at the end of output shaft 11, thereby enabling output shaft 11 to be operated by a brake operating mechanism (not shown).

A gear 11a is knurled on output shaft 11. A ring gear 14 of differential gear J engages with gear 11a. Left and right axles 3L and 3R are differentially coupled with each other through a bevel gear mechanism (not shown) located in ring gear 14.

Output shaft 11 is supported by casing portions 2d and 2e projecting from casing member 2 and extending across the coupling surface and by recesses formed in the upper surfaces of casing portions 2d and 2e, respectively. Output shaft 11 is also supported by receiving portions 1d and 1e projecting from casing member 1 and recesses formed in the lower surfaces of receiving portions 1a and 1e respectively. Bearings 19 are held in circular recesses formed by the abutment of holding portions 2d and 2e and receiving portions 1c and 1d, respectively. Bearings 19 rotatably support gear 11a at both axial ends thereof.

Hydraulic motor M is housed predominantly in casing member 1 and projects minimally into casing member 2. This reduces the height of the casing and thus, interference with obstacles on the ground and potential breakage of the casing is minimized.

Figure 3:
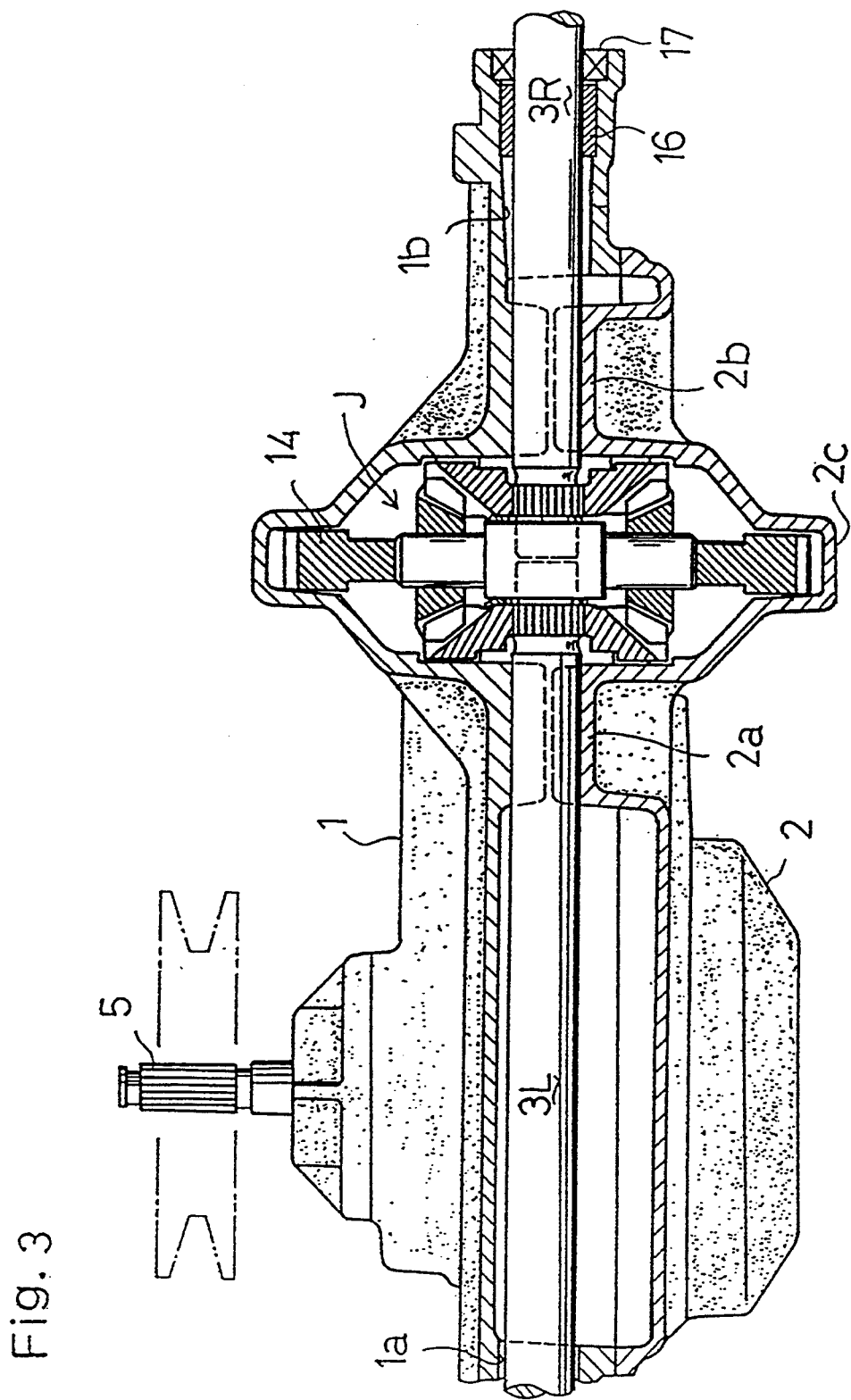
FIG. 3 is a cross-sectional view taken along line 3—3 of FIG. 1.
Figure 5:
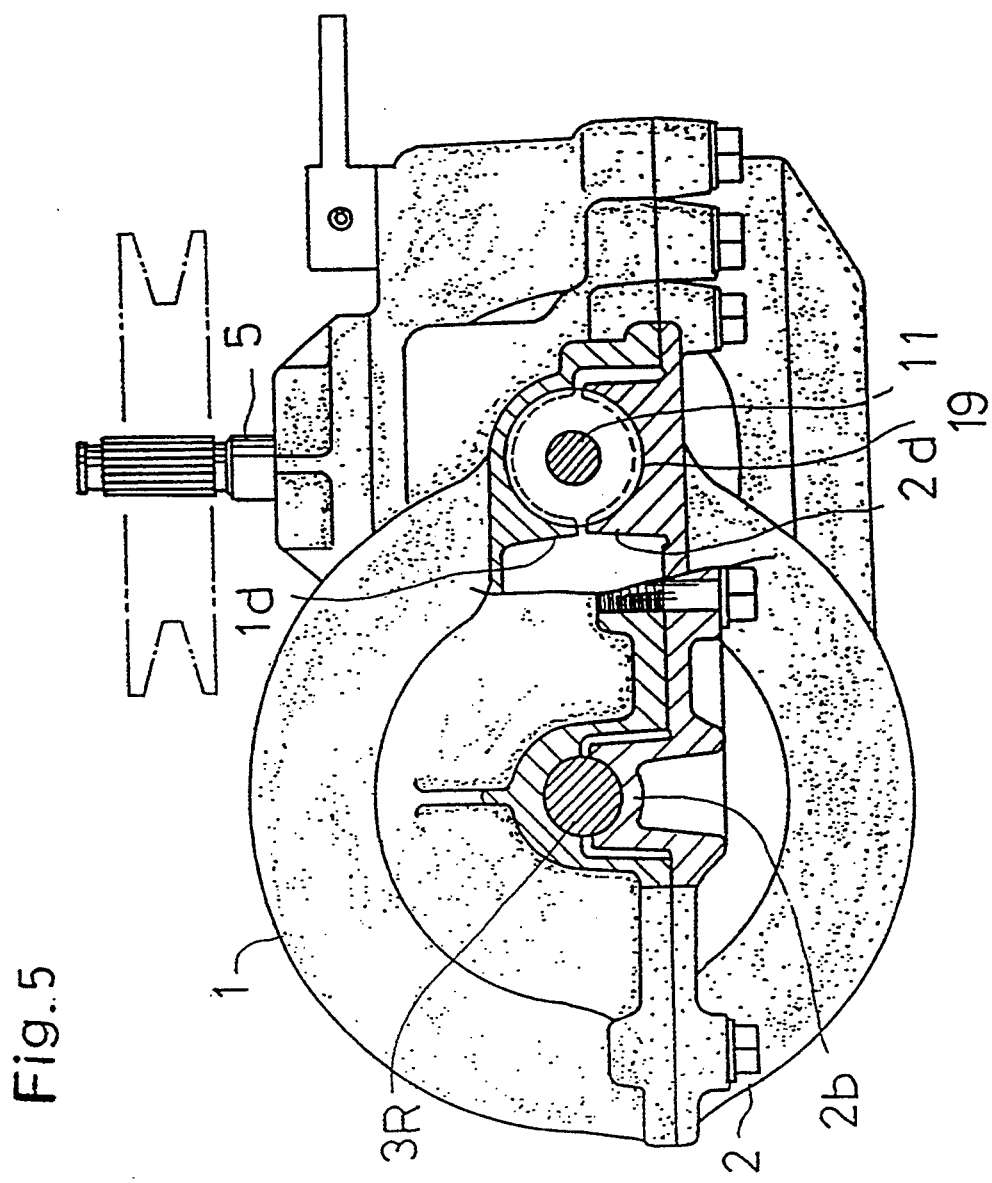
FIG. 5 is a partial cross-sectional view taken along line 5—5 of FIG. 1.
Figure 6:
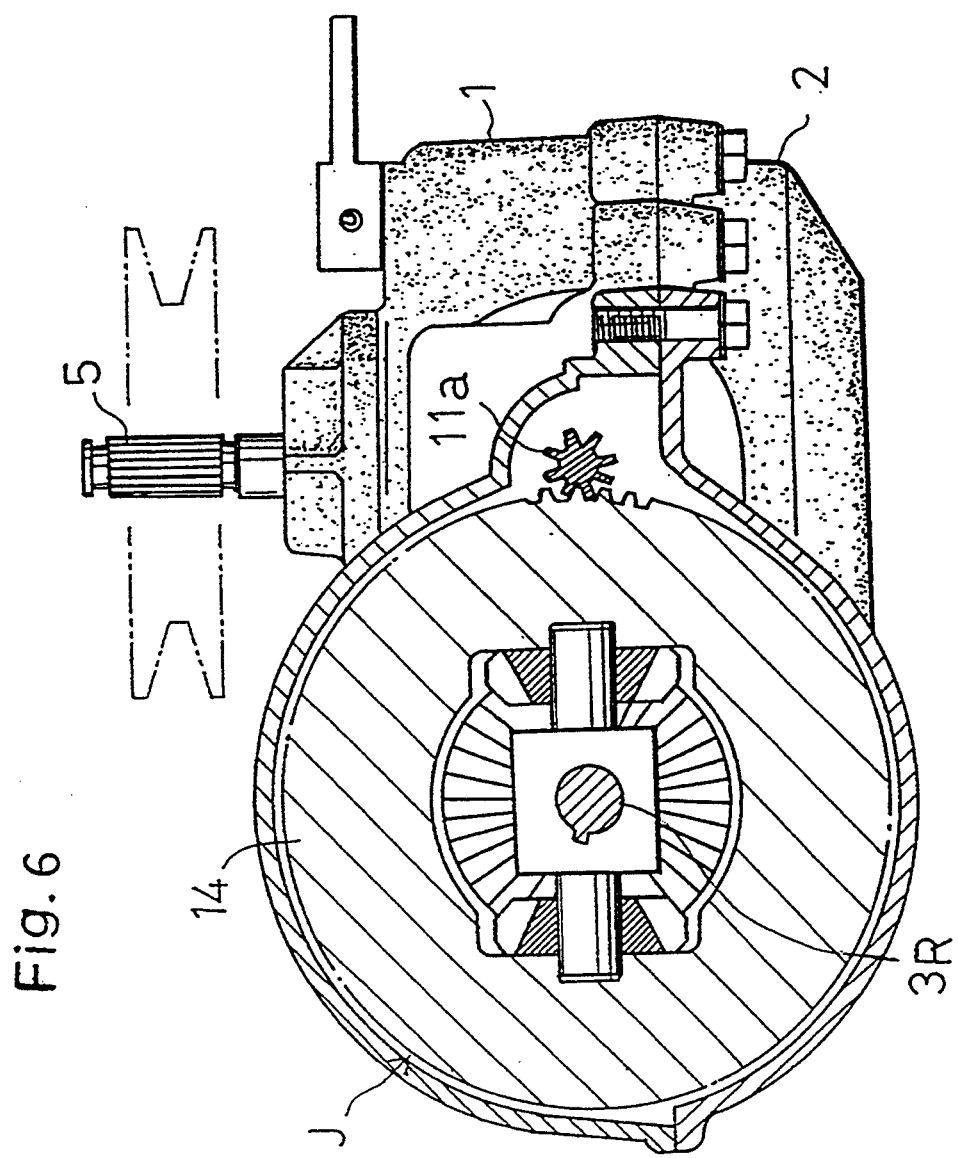
FIG. 6 is a cross-sectional view taken along line 6—6 of FIG. 1.
Figure 7:
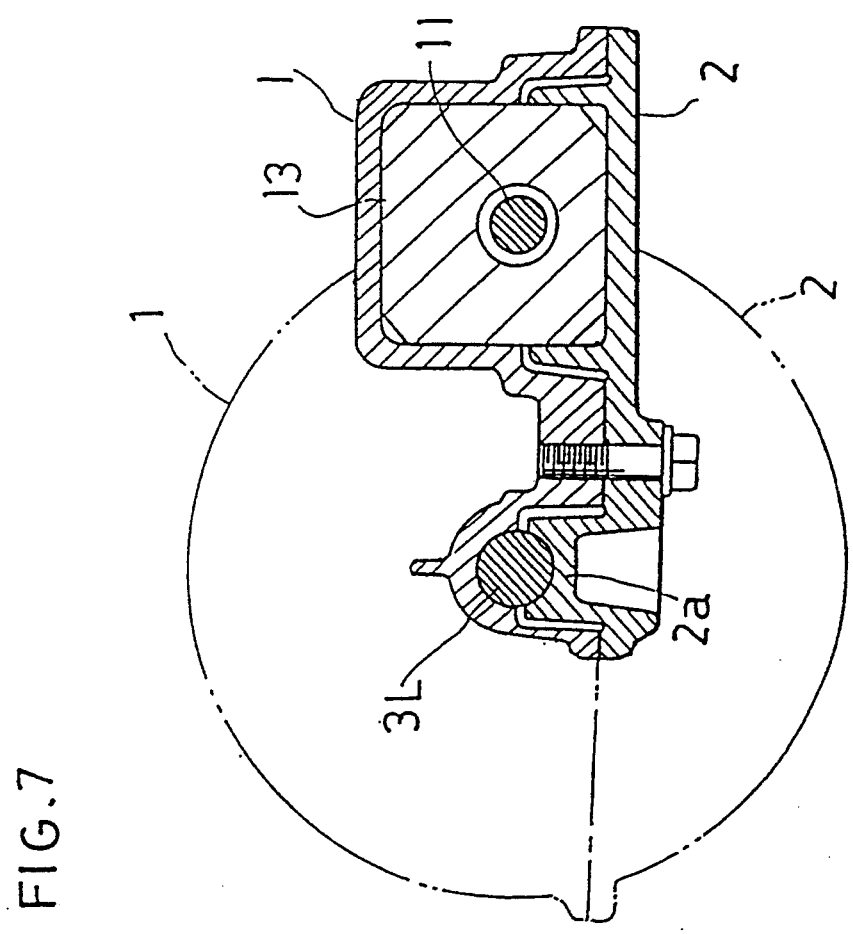
FIG. 7 is a cross-sectional view taken along line 7—7 of FIG. 1.
Figure 8:
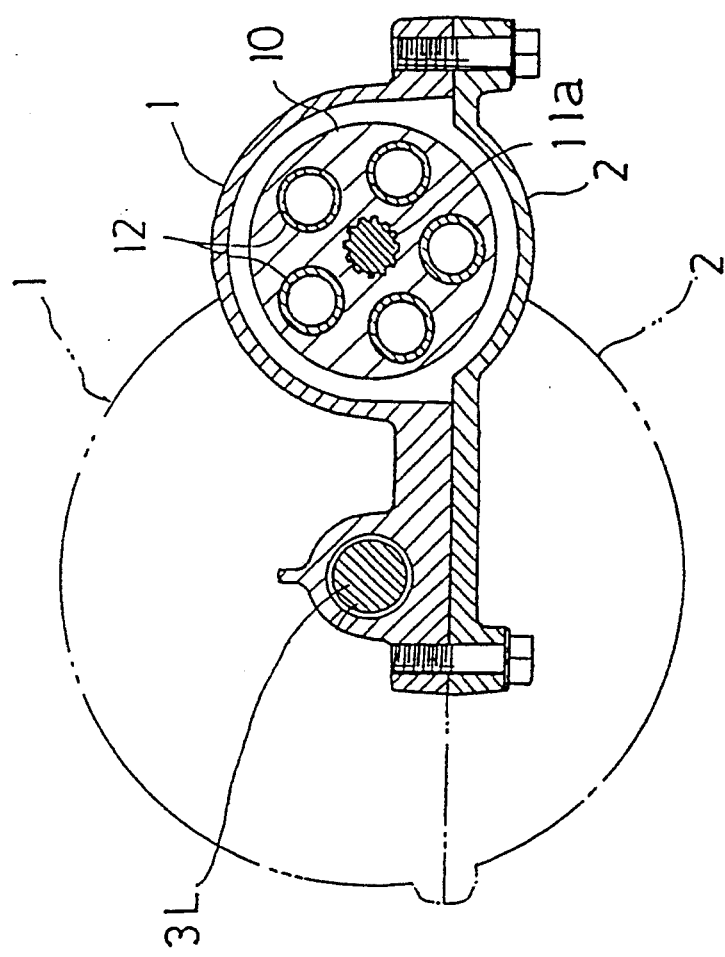
FIG. 8 is a cross-sectional view taken along line 8—8 of FIG. 1.
Figure 10:
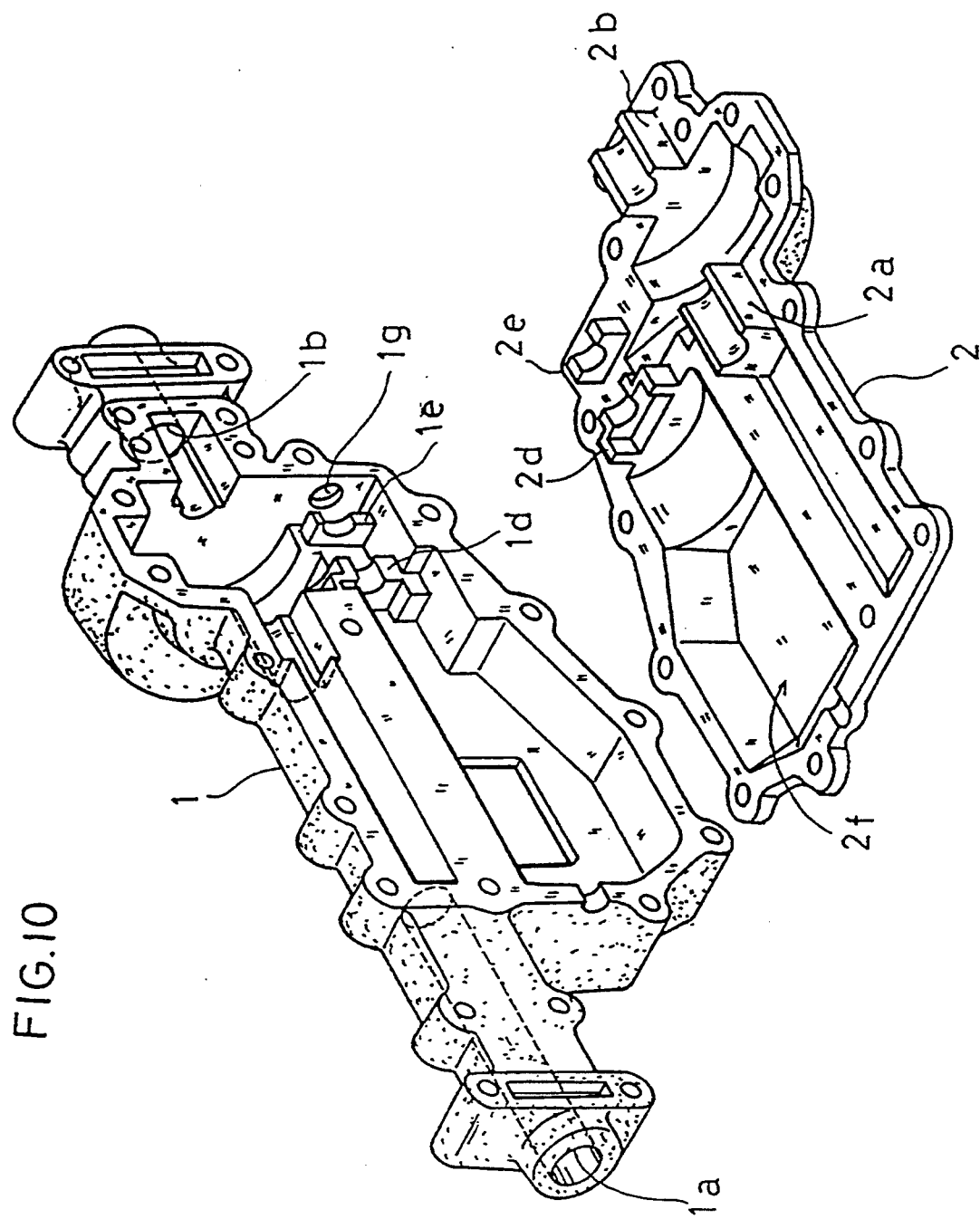
FIG. 10 is a perspective view showing the casing of the present invention.

Axles 3R and 3L are supported by the casing by being inserted at the axial outer ends of the casing into support bores 1a and 1b opened at both side walls of casing member 1 and above the coupling surface thereof. Axle 3R and 3L are supported on the casing side walls through bushes 16, and are provided with oil seals 17 at both axial ends thereof. Also, as shown in FIGS. 5, 7 and 10, projections 2a and 2b rise across the coupling surface of casing member 2 at both axial sides of differential gear J. Substantially circular recesses at the upper surface of projections 2a and 2b support axles 3L and 3R at both axial inner ends thereof between concave receiving surfaces of casing member 1 and the recesses of projections 2a and 2b. Accordingly, axles 3L and 3R are supported within casing member 1, thereby enabling a projection 2c (see FIG. 3) used for covering ring gear 14 at differential gear J, to be smaller in height than in conventional casings.

Figure 9:
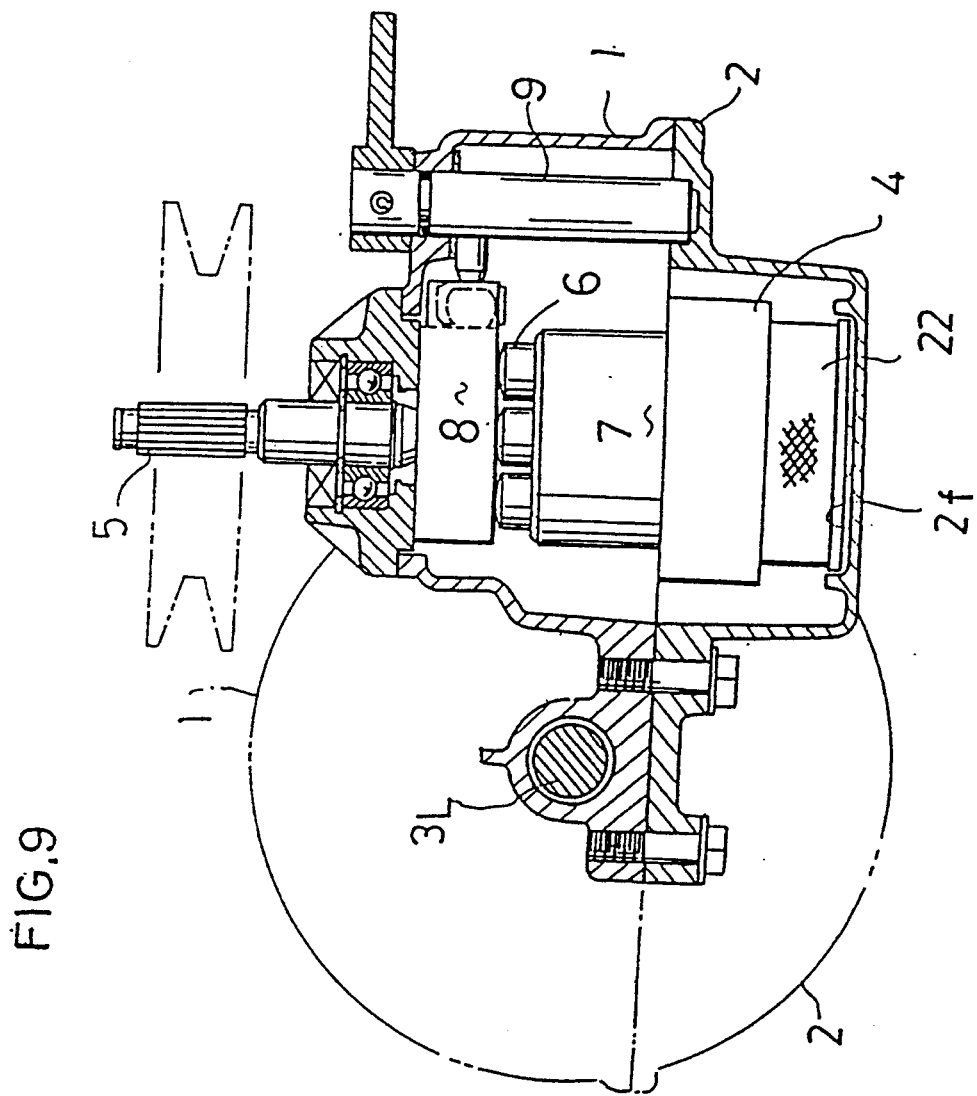
FIG. 9 is a cross-sectional view taken along line 9—9 of FIG. 1.

As shown in FIG. 9, positioned below hydraulic pump P in casing member 2 is a recess 2f for containing therein an oil filter 22. Recess 2f and projection 2c (see FIG. 3) are almost level with each other at their lower surfaces.

Oil filter 22 purifies the oil stored in the casing. After purification, the oil is taken into the supply circuit (not shown) of center section 4 as operating oil for the hydraulic non-stage transmission.

The axle driving apparatus is mounted on a predetermined position of a vehicle body (not shown) so that the coupling surface of the casing is horizontal to the ground. Output shaft 11 attached to motor mounting surface 4b of center section 4 at a side of casing member 1 extends horizontally and in parallel with respect to the coupling surface. Axles 3L and 3R supported by casing member 1 also extend horizontally. When oil filter 22 needs to be changed, only casing member 2 must be removed; hydraulic pump P, center section 4, hydraulic motor M and axles 3L and 3R all remain in casing member 1. Hence, maintenance, such as changing filter 22, is very easy.

As described above, the axle driving apparatus of the present invention is constructed whereby casing member 1 almost completely encloses hydraulic motor M of the hydraulic non-stage transmission. Hence, the recesses formed to enclose hydraulic motor M in casing member 2 and the downward projections in casing member 2 are smaller, thereby reducing interference with obstacles on the ground and breakage of the casing.

Also, when a braking mechanism is attached to the end of output shaft 11 of hydraulic motor M, the sealing capability of the casing is improved.

Also, a major portion of fixed member 13, subjected to the thrust of hydraulic motor M of the hydraulic non-stage transmission, is fixed to casing member 1, thereby enabling the thrust of the motor to be reliably received.

What is claimed is:

1. An axle driving apparatus, comprising:
   at least two casing members coupled together along a coupling surface to form a casing;
   an axle disposed within said casing; and
   a hydraulic non-stage transmission housed within said casing and having an output shaft supported by each of said casing members, said shaft having a longitudinal axis which is disposed parallel to and offset from the plane of said coupling surface and drivingly connected to said axle.

2. An axle driving apparatus, comprising:
   at least two casing members coupled together along a coupling surface to form a casing;
   an axle supported by each of said casing members; and
   a hydraulic non-stage transmission housed within said casing and having an output shaft having a longitudinal axis which is disposed parallel to and offset from the plane of said coupling surface and drivingly connected to said axle.

3. An axle driving apparatus, comprising:
   first and second casing members coupled together along a coupling surface to form a casing;
   a hydraulic non-stage transmission housed within said casing including a plurality of cylinder blocks and including an output shaft having a longitudinal axis which is disposed parallel to and offset from the plane of said coupling surface, said output shaft drivingly connected to an axle;

wherein said first casing member defines a volume which encompasses at least a part of one cylinder block of said hydraulic transmission; and wherein said second casing member defines a volume which encompasses at least a part of one cylinder block of said hydraulic transmission.

4. An axle driving apparatus, comprising:
at least two casing members coupled together along a coupling surface to form a casing;
an axle disposed and entirely rotatably supported within one of said casing members; and
a hydraulic non-stage transmission housed within said casing including an output shaft having a longitudinal axis drivingly connected to said axle, wherein said output shaft is disposed and entirely rotatably supported within said one of said casing members.

5. An axle driving apparatus according to claim 4, wherein the longitudinal axis of said output shaft is disposed parallel to and offset from the plane of said coupling surface.

6. An axle driving apparatus as set forth in claim 1, wherein said hydraulic non-stage transmission further comprises:
a hydraulic motor connected to said output shaft and disposed in parallel to said coupling surface, a major portion of said hydraulic motor being disposed within one of said casing members; and
a mounting surface for said hydraulic motor housed within said casing and extending perpendicularly to said coupling surface into one of said casing members.

7. An axle driving apparatus as set forth in claim 1, further comprising:
an opening disposed in one of said casing members;
an axial end of said output shaft projecting through said opening;
a brake disc mounted on said axial end of said output shaft; and
sealing means disposed between an inner circumferential surface of said opening and a circumferential surface of said axial end of said output shaft.

8. An axle driving apparatus as set forth in claim 6, wherein said hydraulic motor further comprises:
a plurality of axial plunger pistons disposed in said hydraulic motor; and
means for receiving the thrust from said pistons disposed between said casing members along said coupling surface wherein a major portion of said receiving means is supported by one of said casing members.

9. An axle driving apparatus as set forth in claim 1, further comprising:
holding means disposed within said casing; and
bearing means for rotatably supporting said output shaft, supported by said holding means.

10. An axle driving apparatus as set forth in claim 2, wherein said hydraulic non-stage transmission further comprises:
a hydraulic motor connected to said output shaft and disposed in parallel to said coupling surface, a major portion of said hydraulic motor being disposed within one of said casing members; and
a mounting surface for said hydraulic motor housed within said casing and extending perpendicularly to said coupling surface.

11. An axle driving apparatus as set forth in claim 2, further comprising:
an opening disposed in one of said casing members;
an axial end of said output shaft projecting through said opening;
a brake disc mounted on said axial end of said output shaft; and
sealing means disposed between an inner circumferential surface of said opening and a circumferential surface of said axial end of said output shaft.

12. An axle driving apparatus as set forth in claim 10, wherein said hydraulic motor further comprises:
a plurality of axial plunger pistons disposed in said hydraulic motor; and
means for receiving the thrust from said pistons disposed between said casing members along said coupling surface wherein a major portion of said receiving means is supported by one of said casing members.

13. An axle driving apparatus as set forth in claim 2, further comprising:
holding means disposed within said casing; and
bearing means for rotatably supporting said output shaft supported by said holding means.

14. An axle driving apparatus as set forth in claim 3, wherein said hydraulic non-stage transmission further comprises:
a hydraulic motor connected to said output shaft and disposed in parallel to said coupling surface, a major portion of said hydraulic motor being disposed within one of said casing members; and
a mounting surface for said hydraulic motor housed within said casing and extending perpendicularly to said coupling surface.

15. An axle driving apparatus as set forth in claim 3, further comprising:
an opening disposed in one of said casing members;
an axial end of said output shaft projecting through said opening;
a brake disc mounted on said axial end of said output shaft; and
sealing means disposed between an inner circumferential surface of said opening and a circumferential surface of said axial end of said output shaft.

16. An axle driving apparatus as set forth in claim 14, wherein said hydraulic motor further comprises:
a plurality of axial plunger pistons disposed in said hydraulic motor; and
means for receiving the thrust from said pistons disposed between said casing members along said coupling surface wherein a major portion of said receiving means is supported by one of said casing members.

17. An axle driving apparatus as set forth in claim 2, further comprising:
holding means disposed within said casing; and
bearing means for rotatably supporting said output shaft supported by said holding means.

18. An axle driving apparatus, comprising:
at least two casing members coupled together along a coupling surface to form a casing;
an axle disposed within said casing; and
a hydraulic non-stage transmission housed within said casing including an output shaft having a longitudinal axis drivingly connected to said axle, wherein said output shaft is disposed and entirely rotatably supported within one of said casing members.

19. An axle driving apparatus as set forth in claim 18, wherein said hydraulic non-stage transmission further comprises:

a hydraulic motor connected to said output shaft and disposed in parallel to said coupling surface, a major portion of said hydraulic motor being disposed within one of said casing members; and a mounting surface for said hydraulic motor housed within said casing and extending perpendicularly to said coupling surface into one of said casing members.

20. An axle driving apparatus as set forth in claim 18, further comprising:

an opening disposed in one of said casing members;

an axial end of said output shaft projecting through said opening;

a brake disc mounted on said axial end of said output shaft; and sealing means disposed between an inner circumferential surface of said opening and a circumferential surface of said axial end of said output shaft.

21. An axle driving apparatus as set forth in claim 19, wherein said hydraulic motor further comprises:

a plurality of axial plunger pistons disposed in said hydraulic motor; and means for receiving the thrust from said pistons disposed between said casing members along said coupling surface wherein a major portion of said receiving means is supported by one of said casing members.

22. An axle driving apparatus as set forth in claim 18, further comprising:

holding means disposed within said casing; and bearing means for rotatably supporting said output shaft, supported by said holding means.

* * * * *

UNITED STATES PATENT AND TRADEMARK OFFICE
CERTIFICATE OF CORRECTION

PATENT NO. : 5,377,487
DATED : January 3, 1995
INVENTOR(S) : Azuma et al

It is certified that error appears in the above-indentified patent and that said Letters Patent is hereby corrected as shown below:

Column 1, line 24, delete "tile" and insert --the-- therefor.

Column 2, line 51, delete "shalt" and insert --shaft-- therefor.

Signed and Sealed this

Twenty-third Day of May, 1995

Attest:

BRUCE LEHMAN

*Attesting Officer*   *Commissioner of Patents and Trademarks*